I. F. MUNSON.
Vehicle-Wheel.
No. 219,500. Patented Sept. 9, 1879.
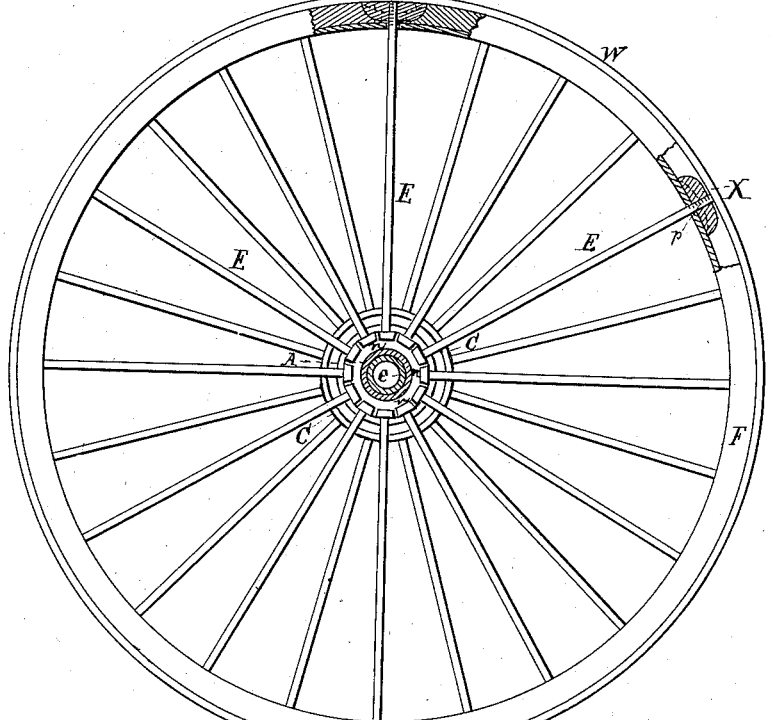
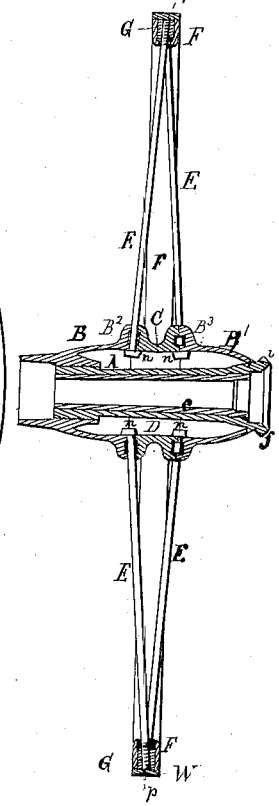
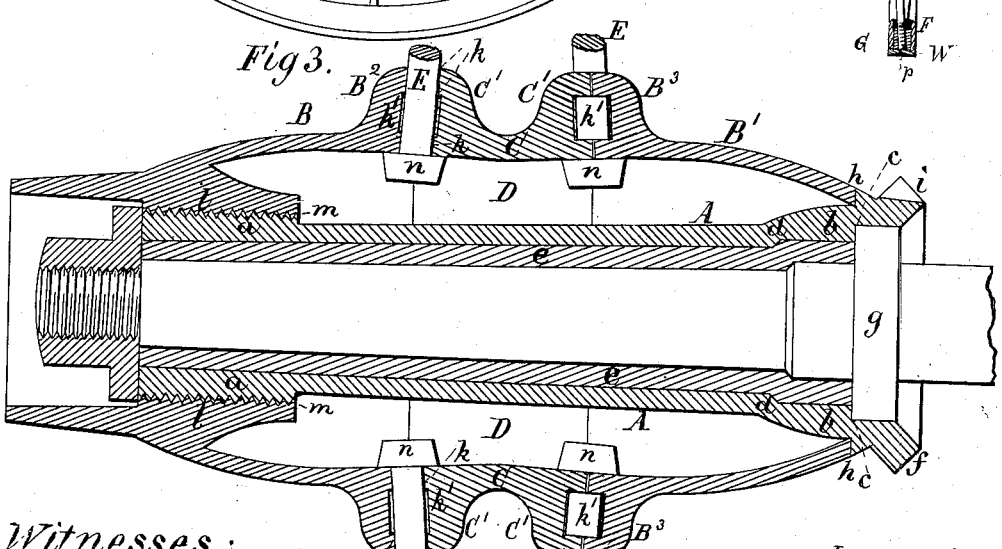
Witnesses:
J. P. Th. Lang
G. H. Theo. Lang
Inventor:
Ira F. Munson
by Mason Fenwick Lawrence
Attys.

2 Sheets—Sheet 2.

I. F. MUNSON.
Vehicle-Wheel.

No. 219,500. Patented Sept. 9, 1879.

Witnesses:
J. P. Th. Lang.
G. H. Theo. Lang.

Inventor:
Ira F. Munson
by
Mason Fenwick & Lawrence
Attys

UNITED STATES PATENT OFFICE.

IRA F. MUNSON, OF WASHINGTON, DISTRICT OF COLUMBIA.

IMPROVEMENT IN VEHICLE-WHEELS.

Specification forming part of Letters Patent No. 219,500, dated September 9, 1879; application filed July 14, 1879.

*To all whom it may concern:*

Be it known that I, IRA F. MUNSON, of Washington, in the county of Washington and District of Columbia, have invented a new and useful Improvement in Carriage and other Wheels; and I do hereby declare that the following is a full, clear, and exact description of the same, reference being had to the accompanying drawings, forming part of this specification, in which—

Figure 4:
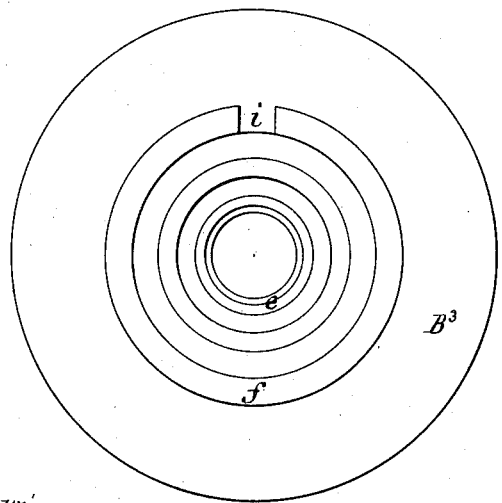
Figure 8:
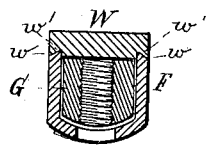
Figure 11:
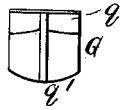
Figure 12:
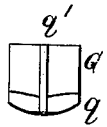
Figure 5:
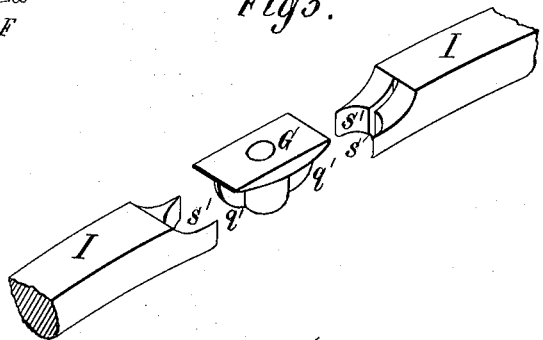
Figure 9:
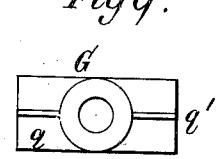
Figure 10:
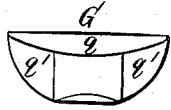
Figure 6:
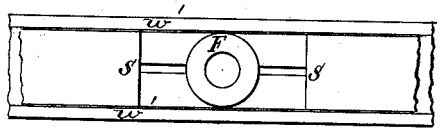
Figure 7:
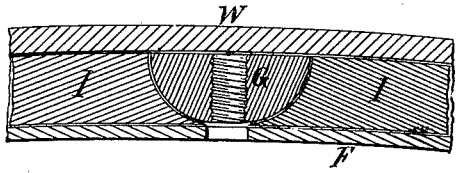

Figure 1 is a partial section and partial side elevation of the improved wheel. Fig. 2 is a vertical longitudinal section of the hub and cross-section of the rim of the wheel and nuts with the spokes in elevation. Fig. 3 is a vertical longitudinal section of the hub, showing the spokes broken off. This view is on a larger scale than the others. Fig. 4 is an end view of the hub. Fig. 5 is a perspective view of one of the nuts and two pieces of wood filling. Fig. 6 is a top view of the rim or felly with wooden filling-pieces in its hollow. Fig. 7 is a detail section of the rim, tire, nut, and filling-pieces at Y, Fig. 1. Fig. 8 is a transverse section of the same. Fig. 9 is a bottom view of the nut at Y, Fig. 1. Fig. 10 is a side elevation of the same. Fig. 11 is an end elevation of the nut shown in Figs. 9 and 10, and Fig. 12 is an end elevation of the nut shown at X in Fig. 1. This nut is similar to the other except that the flanged portion is rounded to conform to the transverse shape of the rim or felly, while the nut shown in Fig. 10 and at Y in Fig. 1 has its flanged portion flat in transverse section, to conform to the shape of the tire transversely, while its body portion, at bottom, is rounded off.

The object of my invention is to render more practicable than heretofore the substitution of wrought and cast metal combined for wood and metal combined in the construction of carriage-wheels, using wood only when desired as a filling for the hollow rims of the wheels.

The nature of my invention consists, first, in nuts for the screw ends of the spokes, provided with flanges, which form a long and broad bearing-face, and with longitudinal ribs, which strengthen flanged nuts, in combination with a hollow rim or felly and screw-bolt spokes, as will be hereinafter described; second, in the combination of an axle-box bolt, a hub composed of flanged radially-grooved clamping-sections, which form a chamber between themselves and the axle-box bolt, screw-bolt spokes, with heads on their inner and screw-threads on their outer ends, as will be hereinafter described; third, in the combination of the flanged and braced nuts, wooden filling-segments, semi-tubular rim or felly, and screw-bolt spokes, whereby abutments of wood are provided for the nuts, as will be hereinafter described; fourth, in a sand-shedding band formed on the inner end of the axle-box bolt, said band being inclined on three sides and arranged just beyond the collar of the axle, as will be hereinafter described; fifth, in a wheel having metal rim and tire, metal spokes and nuts, metal hub, and axle-box bolt, constructed and combined as hereinafter described, whereby the spokes can be screwed up separately for tightening the wheel throughout, and they are free to yield radially under severe concussions; also the sections of the hub serve for clamping the spokes in position, while they are removable for the withdrawal of the spokes, said clamping-sections being drawn together and made separable from one another by simply turning the axle-box bolt in the proper directions; sixth, in nuts for fitting in the rim or felly of the wheel, of segmental form longitudinally and rounded at their bottoms transversely, and provided with flanges and ribs, as will be presently described.

In the accompanying drawings, A is the axle-box, which I have termed an "axle-box bolt," inasmuch as it serves both as a box for the axle and as a bolt for drawing the sections of the hub together. It is formed with a screw-threaded collar, *a*, at its outer end, and with an enlarged flaring inner end, *b*, provided with a shoulder, *c*, for the collar *g* of the axle to bear against, and a shoulder, *d*, for a brass or Babbitt-metal bushing, *e*, to abut against. The extreme portion of this inner end of the box is made with three inclined surfaces, so as to form a sand-band, *f*, beyond the collar *g* of the axle, which sand-band sheds the sand from its inclined surfaces, both on its bottom and top sides, the sand escaping either around the axle or around the band *f*, as will be clearly understood from the drawings.

A shoulder, *h*, is also formed on the axle-box bolt A by a beveled extension formed in the sand-band, for the inner end of the hub of the wheel to abut against.

In the sand-band a notch is provided, at $i$, for the insertion of a wrench or key when it is desired to screw in or out the box A.

The hub is composed of tubular sections B C $B^1$, the sections B $B^1$ being flared from their inner to their outer ends, and the section C being cylindrical.

The diameter of the parts B C $B^1$, except where the parts B and $B^1$ unite with the box A, is much greater than the said box, so as to give the hub the proper arching form in longitudinal section, and at the same time make it symmetrical in appearance and light and strong, and also provide a chamber, D, between the axle-box bolt A and the inner circumference of the sections of the hub, for the heads of the screw-bolt spokes to move in radially when the wheel is subjected to violent concussions.

The sections of the hub are respectively formed with flanges or clamping-faces $B^2$ $C'$ $B^3$, in which radial semi-cylindrical bearing-grooves $k$ are provided for the reception of the necks of the screw-bolt spokes E.

In order to make the sections light, the grooves $k$ are intersected by a concentric circular groove, $k'$, cut into the flanges a little deeper than the diameter of the half-circular radial grooves. By this means, also, the grooves $k$ can be more easily reamed out, as a shorter distance has to be traveled through solid metal by the reamer. This construction also gives a better clamping action upon the necks of the spokes than does a surface with a continuous groove through the flanges.

It will be seen that the respective pairs of the semicircular grooves form, when the faces of the flanged portions of the hub-sections are brought together, circular boxes for the respective spokes.

The hub-section C has grooves $k$ on both of its faces, and when the sections B and $B^1$ are screwed up against it boxes for two sets of spokes set inclined in reverse directions are formed, the spokes having one inclination occupying positions between those having a reverse inclination.

It is practicable to make the section C in two parts in the same manner as in a former patent to me, and for the same purpose, and when thus made in two parts the office of clamping the spokes will be effected in the same way as when it is made in one piece, as shown in my present case.

On the outer thickened end of the hub-section B an inner screw-threaded shoulder, $l$, is provided, and into the thread $m$ thereof the shouldered screw-threaded end $a$ of the axle-box bolt screws, when said bolt is operated by a wrench applied in the notch $i$ and the axle-box bolt turned inward thereby.

The spokes E are round bolts with heads $n$ on their inner ends and screw-threads $p$ on their outer ends.

The heads $n$ pull upward or radially outward against the inner circumference of the hub-sections, and the screw ends pass through holes in the felly or rim F of the wheel and enter nuts G placed in the hollow of said rim.

The rim or felly is of semi-tubular or inverted-arch form in transverse section, and it is produced by rolling it in one piece out of thin plate metal and uniting its ends by welding after it is bent into a circular form, or in any suitable manner.

The nuts G are circular on their body portion, and are provided near their tops or bottoms with flanges $q$, whose sides are flat; and they are ribbed longitudinally and centrally, as shown at $q'$. This construction is adopted in order that the nuts shall not turn in the hollow of the felly when the spokes are screwed into them, and shall have great strength. These nuts are of a thickness nearly equal to the depth of the hollow of the rim or felly, in order to give a sufficient length of screw-thread for holding the screw-threaded ends of the screw-bolt spokes E.

The straight sides of the nuts, by bearing against the inner sides of the hollow felly, prevent the nuts from turning, and therefore the spokes can be turned into them when the wheel is first made, and afterward, for the purpose of tightening up the wheel in case of shrinkage, or when from any other cause it is necessary to turn the spokes. The nuts G are segmental in form in one direction. They are rounded off at their bottoms, so as to fit the curvature of the hollow rim cross-wise.

In wheels where it is desirable to fill the hollow felly with wood, as at I, it is done by turning the nuts G upside down, as shown in Fig. 1 at Y. The wood segments I are provided with channels $s$, to receive the ribs $q'$ of the nuts, and with segmentally-recessed ends $s'$, to receive the circular body portion of the nuts, as shown in the drawings, and the wood segments serve as abutments for the nuts to rest against when the wheel is in use, and also for strengthening the rim and wheel.

The tire W is of wrought metal, and provided with a beveled rabbet, $w$, which fits upon the beveled upper edge, $w'$, of the felly. The tire thus constructed will, when shrunk upon the wheel, be held in place without any other fastening, and the pressure upon the same will tend to make it fit tighter to its seat.

In some descriptions of wheels, especially heavy ones, the rim or felly might be made of cast malleable metal; but I prefer for all light wheels to make the felly of wrought metal.

What I claim is—

1. The combination of nuts G, provided with flanges $q$ and ribs $q'$, a hollow rim or felly, F, and screw-bolt spokes E, substantially as and for the purpose described.

2. The combination of the axle-box bolt A, the hub composed of sections B C $B^1$, having radially-grooved clamping-flanges $B^2$ $C'$ $B^3$, and shaped to form chamber D, the screw-bolt spokes E, having heads on their inner ends and screw-threads on their outer ends, substantially as and for the purpose described.

3. The combination of the flanged and braced nuts G, segmental wooden filling-pieces I, channeled at $s$ and recessed at $s'$, semi-tubular felly, and screw-bolt spokes, substantially as described.

4. The sand-band $f$, formed on the inner end of the axle-box bolt A, and inclined on three sides, substantially as described.

5. In a metal wheel, the combination of the axle-box bolt A, clamping-sections B C $B^1$, having radially-grooved flanges $B^2$ $C'$ $B^3$, chamber D, screw-bolt spokes, rim or felly F, of semi-tubular form, a suitable tire, W, and nuts G, substantially as and for the purpose described.

6. The flanged and ribbed nuts G, of segmental form and rounded at their bottoms, substantially as described.

I. F. MUNSON.

Witnesses:
H. A. HALL,
J. P. THEODORE LANG.